United States Patent
Chittaro (10) Patent No.: US 11,522,891 B2
(45) Date of Patent: Dec. 6, 2022

(54) MACHINE LEARNING ANOMALY DETECTION OF PROCESS-LOADED DLLS

(71) Applicant: MICRO FOCUS LLC, Santa Clara, CA (US)

(72) Inventor: Ron Chittaro, Ottawa (CA)

(73) Assignee: MICRO FOCUS LLC, Santa Clara, CA (US)

(*) Notice: Subject to any disclaimer, the term of this patent is extended or adjusted under 35 U.S.C. 154(b) by 414 days.

(21) Appl. No.: 16/695,781

(22) Filed: Nov. 26, 2019

(65) Prior Publication Data

US 2021/0160265 A1 May 27, 2021

(51) Int. Cl.
| | |
|---|---|
| H04L 29/06 | (2006.01) |
| H04L 9/40 | (2022.01) |
| G06F 11/30 | (2006.01) |
| H04L 43/065 | (2022.01) |
| G06N 20/00 | (2019.01) |

(52) U.S. Cl.
CPC ........ *H04L 63/1425* (2013.01); *G06F 11/302* (2013.01); *G06N 20/00* (2019.01); *H04L 43/065* (2013.01)

(58) Field of Classification Search
None
See application file for complete search history.

(56) References Cited

U.S. PATENT DOCUMENTS

| | | | |
|---|---|---|---|
| 8,955,124 B2 | 2/2015 | Kim et al. | |
| 9,928,364 B2 | 3/2018 | Wang | |
| 10,205,743 B2 | 2/2019 | Cp et al. | |
| 2002/0129277 A1* | 9/2002 | Caccavale | G06F 21/562 709/224 |
| 2005/0021971 A1* | 1/2005 | Patankar | G06F 21/57 713/176 |
| 2009/0133126 A1* | 5/2009 | Jang | G06F 21/56 726/24 |
| 2014/0337836 A1* | 11/2014 | Ismael | G06F 3/0631 718/1 |

FOREIGN PATENT DOCUMENTS

KR 101375656 3/2014

OTHER PUBLICATIONS

Kwon, T. et al., "Automatic detection of unsafe component loadings", ISSTA'10, Jul. 12-16, 2010, Trento, Italy.
Glendowne, D. et al. "Characteristics of Malicious of DLLS in Window Memory", 11th IFIP International Conference an Digital Forensics(DF), Jan. 2015, Orlando, FL, United States, pp. 149-161.
Xie, X. et al., "Lightweight examination of DLL environments in virtual machines to detect malware", SCC'16, May 30-Jun. 3, 2016, Xi'an, China, DOI: http://dx.doi.org/10.1145/2898445.2898456.

* cited by examiner

*Primary Examiner* — William J. Goodchild

(57) ABSTRACT

An endpoint device monitors loading of dynamically loaded libraries (DLLs) by a process, such as during execution of the process on the endpoint device. The endpoint device can generate an endpoint-independent representation of the DLLs upon exiting of the process. The endpoint device may generate a hash, such as a one-way hash, of the endpoint-independent representation. The endpoint device may transmits the process and the hash to a management device to detect in a machine learning manner whether loading of the DLLs during the execution of the process was anomalous.

20 Claims, 9 Drawing Sheets

MACHINE LEARNING ANOMALY DETECTION OF PROCESS-LOADED DLLS

BACKGROUND

In the context of a computing device, a process may be considered an instance of a computer program's program code that is being executed. A process can invoke functionality provided by dynamically loaded libraries (DLLs). A DLL is a library of program code that a process loads into memory at process load or run time, in lieu of the library being added to the computer program's own program code during creation of the program's executable file. A DLL may be a shared library that different processes can each separately load into memory at load or run time.

Different operating systems refer to DLLs using different nomenclature. Versions of the Microsoft Windows operating system refer to DLLs as dynamically linked libraries. Versions of the Unix operating system, versions of the Linux operating system, which is a Unix-like operating system, and versions of the MacOS, iOS, and iPadOS operating systems, which are Unix-based operating systems, refer to DLLs as dynamically linked shared object libraries, dynamically linked shared objects, and/or dynamically linked shared libraries. The MacOS, iOS, and iPadOS operating systems also refer to DLLs in the context of frameworks. In Java and .NET frameworks, classes within Java archive (JAR) files and .NET assemblies, respectively, are in effect DLLs.

DETAILED DESCRIPTION

As noted in the background, a process can at load or run time load into memory a dynamically loaded library (DLL). A computing device may have tens, hundreds, or even more processes running at any given time. Processes may continually start and stop (i.e., exit) execution as the computing device runs different computer programs or otherwise performs different functionality. In turn, each process may, to perform its own functionality, continually load (as well as unload) DLLs to leverage the functionality that the DLLs provide. Which DLLs a process loads, and the order in which the process loads the DLLs, can vary every time the process is executed.

Like other aspects of computing technology, DLLs can be vulnerable to security threats. More specifically, DLLs can be vulnerable to a variety of different DLL malware techniques, including DLL injection and DLL hijacking, the latter which is also referred to as DLL sideloading and DLL preloading. DLL malware techniques involve manipulating a process or the computing device itself, such as the operating system running thereon, so that the process loads a potentially malicious DLL instead of or in addition to an intended DLL.

In enterprise and other relatively large-scale computing environments, a computing device referred to herein as a management device may be responsible for detecting anomalous behavior, including anomalous DLL loading by processes, on a large number of other computing devices. The latter computing devices are referred to herein as endpoint devices, and can include client computing devices, as well as server computing devices. In the latter case, the management device may be one server computing device and the endpoint devices may be other server computing devices.

The management device may leverage artificial intelligence techniques like machine learning to detect such anomalous behavior, which may be indicative of an endpoint device having had its security compromised, or may just indicate that the endpoint device is improperly configured or is otherwise malfunctioning. The machine learning technique may be an unsupervised learning technique, in which a machine learning model learns what behavior is anomalous as input data is provided, without any initial training of the model. In unsupervised learning, the machine learning model is continuously updated and refined to better detect anomalous behavior, as additional data is input.

In the context of anomalous DLL loading detection, however, usage of machine learning techniques like unsupervised learning can become intractable in environments in which a management device is responsible for detecting such anomalous behavior on endpoint devices. For instance, a straightforward machine learning approach may involve checking each time a process executing on an endpoint device loads a DLL whether the DLL is anomalous. Specifically, an endpoint device may transmit identification of both the process and the DLL to the management device, which may then detect whether loading of the DLL by the process is anomalous and thus potentially a security threat.

However, this approach can quickly saturate the communication links, such as the network, between the endpoint devices and the management device. As noted above, processes continually start and stop execution on endpoint devices, and while executing, each process can load a large number of DLLs. Even networks having the largest amounts of bandwidth may become overwhelmed by the amount of information transmitted. Furthermore, the management device itself can become overwhelmed in its ability to train or even use a machine learning model while constantly being deluged by such communication from the endpoint devices. Endpoint device performance can likewise suffer, since constant transmission of process and DLL identification information interrupts process execution, particularly if the endpoint device has to wait for return communication from the management device as to whether the loading of a DLL by a process was anomalous.

Techniques described herein overcome such shortcomings. An endpoint device may monitor loading of DLLs by each process during execution on the endpoint device. Upon exiting of a process, the endpoint device may generate an endpoint-independent representation of the DLLs loaded by the process during execution, and a hash, such as a one-way hash, of the endpoint-independent representation. The endpoint device may transmit the process (e.g., an identifier thereof) and the hash to a management device, which can detect in a machine learning manner whether loading of the DLLs during execution of the process was anomalous. In another implementation, the endpoint device may transmit the endpoint-independent representation to the management device, and not generate nor transmit the hash.

The endpoint-independent representation identifies the DLLs that a process loaded in a way that is not specific to (i.e., independent of) the endpoint device itself. The endpoint-independent representation can further be independent of the order in which the DLLs are loaded. Therefore, execution of the same process on different endpoint devices, during which the process loads the same DLLs on each device, yields the same endpoint-independent representation. In another implementation, the endpoint device generates a representation of the DLLs that is not necessarily endpoint independent, and transmits the representation to the management device, which responsively generates the endpoint-independent representation.

The techniques described herein significantly reduce the amount of data transmitted between the endpoint devices and the management device. The hash may not be not generated—and thus not transmitted to the management device—until a process has finished executing. Instead of transmitting the identification of every DLL that a process loads as the process loads the DLLs, the endpoint device may transmits a hash that encodes all the DLLs that the process loaded during execution.

Therefore, the techniques described herein decrease the processing load on the management device in using the machine learning model to detect anomalous DLL loading by processes, and in continuously training the model in the case of unsupervised learning. The management device is more likely to be able to keep up with the reduced amount of information that the endpoint devices send in the described techniques. Furthermore, endpoint device performance is less likely to be affected, both because the amount of information transmitted is reduced and because DLL loading information for a process ma not be transmitted until the process has finished executing. Execution of a process is not interrupted to transmit DLL loading information each time the process loads a DLL.

Figure 1:
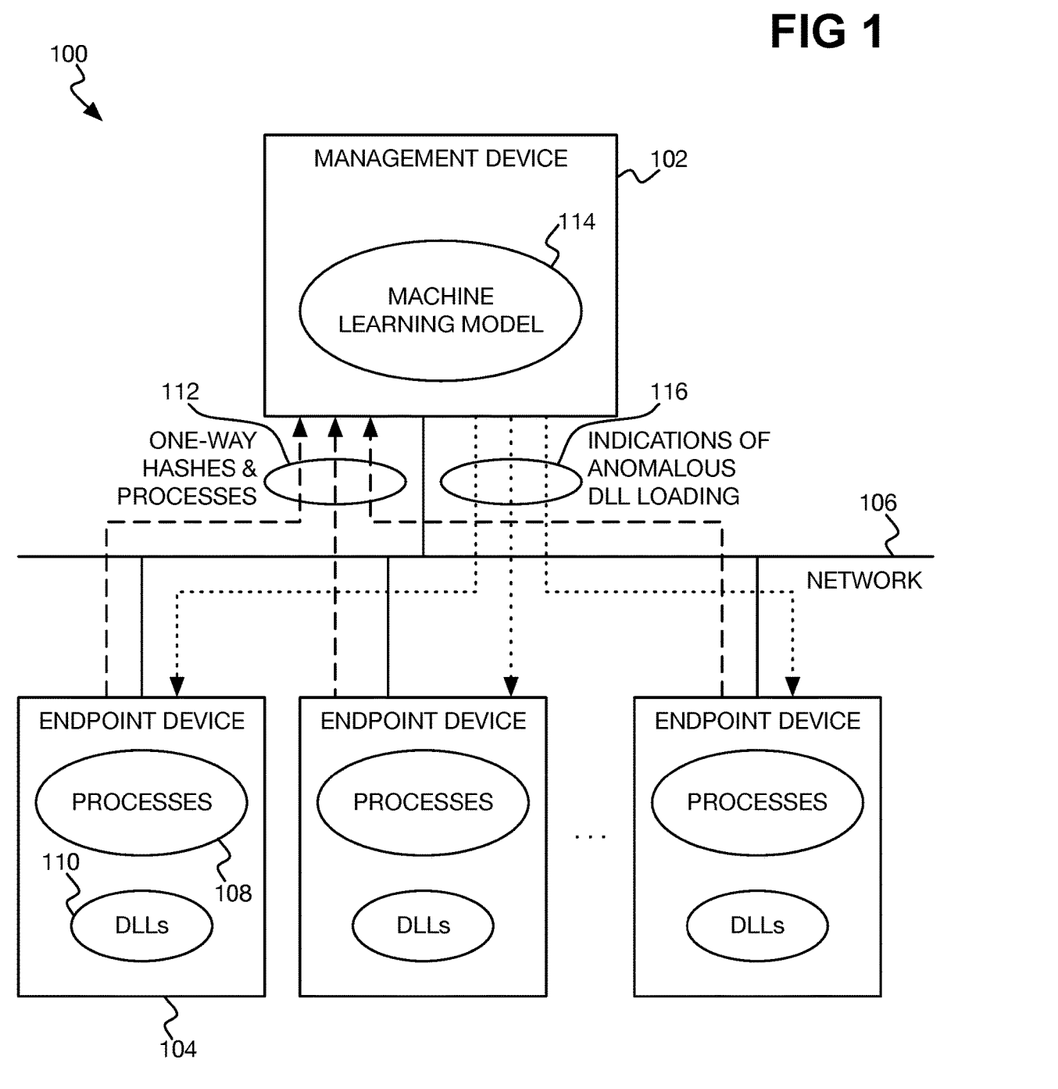
FIG. 1 is a diagram of an example system including a management device and endpoint devices.

FIG. 1 shows an example system 100. The system 100 includes a management device 102 and endpoint devices 104 communicatively connected via a network 106. The management device 102 and the endpoint devices 104 can each be a computing device, such as a server computing device like a blade server or a client computing device. Examples of client computing devices include laptop computers, desktop and notebook computers, tablet computing devices, smartphones, and so on. The endpoint devices 104 may themselves be server computing devices. The network 106 may be or include the Internet, intranets, extranets, wide-area networks, local-area networks, wired and wireless communication networks, and so on.

The management device 102 and the endpoint devices 104 may be part of a computing environment for an organization like an enterprise. In another implementation, the endpoint devices 104 may be part of the computing environment for an organization, and the management device 102 operated by a service provider providing a service to the organization. In still another implementation, the endpoint devices 104 as well as the management device 102 may be operated by a service provider providing a service to one or more organizations.

Each endpoint device 104 includes processes 108 executing on the device 104, as well as DLLs 110 loaded by the processes 108 while executing. Each endpoint device 104 monitors the DLLs 110 that each process 108 loads, such as during execution. In the example of FIG. 1, as the processes 108 finish (i.e., exit) execution on the endpoint devices 104, the devices 104 transmit one-way hashes and the processes 108 (e.g., identifiers thereof) over the network 106 to the management device 102, as indicated by dashed lines 112 in FIG. 1.

In the example of FIG. 1, an endpoint device 104 generates the one-way hash from an endpoint-independent representation of the DLLs 110 loaded by a process 108 during execution on the device 104. The endpoint device 104 generate the endpoint-independent representation from the DLLs 110 themselves, such as from identifiers thereof like file paths of the DLLs 110. The identifiers may additionally or alternatively include DLL size, checksum values of the DLLs, versions, and so on. The endpoint-independent representation may be independent of the order in which the DLLs 110 have been loaded, or may be dependent on that order. While the generated hash is primarily described herein as a one-way (i.e., irreversible) hash, the hash may instead be a two-way (i.e., reversible) hash. Furthermore, in another implementation, in lieu of generating and transmitting hashes, the endpoint devices 104 may instead simply transmit the endpoint-independent representations of the DLLs 110, or representations of the DLLs 110 that are not necessarily endpoint independent.

The management device 102 maintains a machine learning model 114. In the example of FIG. 1, as the management device 102 receives the hashes (e.g., one-way hashes) and processes 108 (i.e., identifiers thereof), the device 104 uses the machine learning model 114 to determine whether the loading of the DLLs 110 by the processes 108 during execution was anomalous. The management device 102 may responsively transmit indications of anomalous DLL loading to the endpoint devices 104, as indicated by dotted lines 116 in FIG. 1. Responsive to receiving the indications, the endpoint devices 104 may prevent the processes 108 to which the indications pertain from loading the indicated DLLs 110 during subsequent execution.

As a specific example, upon receiving a one-way hash of the endpoint-independent representation of the DLLs 110 loaded by a process 108 during execution on an endpoint device 104, the management device 102 may input the one-way hash and the process 108, such as an identifier thereof, to the machine learning model 114. The output of the machine learning model 114 may be a score or value indicative of a confidence level as to whether the loading of the DLLs 110 by the process 108 was anomalous. If the confidence level is greater than a threshold, the management device 102 may send an indication to the endpoint device 104, which may prevent the process 108 from loading the DLLs 110 the next time the process 108 is executed on the device 104.

The machine learning model 114 may be an unsupervised learning model. The management device 102 may therefore continually train, or refine or update, the machine learning model 114 as the device 102 receives one-way hashes and processes 108 from the endpoint devices 104. As the management device 102 receives these one-way hashes and processes and correspondingly trains the machine learning model 114, accuracy of the model 114 in detecting anomalous DLL loading by the processes 108 can improve. The machine learning model 114 may initially be in an untrained state, such that until sufficient one-way hashes and processes are received from endpoint devices 104, the model 114 is unable to predict with sufficient confidence whether the DLL loading was anomalous. In this respect, it is noted that since the representations are endpoint independent, loading of a DLL 110 by a process 108 on one endpoint device 104 may be able to be detected as anomalous (or not) based on the loading of the same DLL 110 by other processes 108, even if the process 108 is loading the DLL 110 for the first time.

Figure 2:
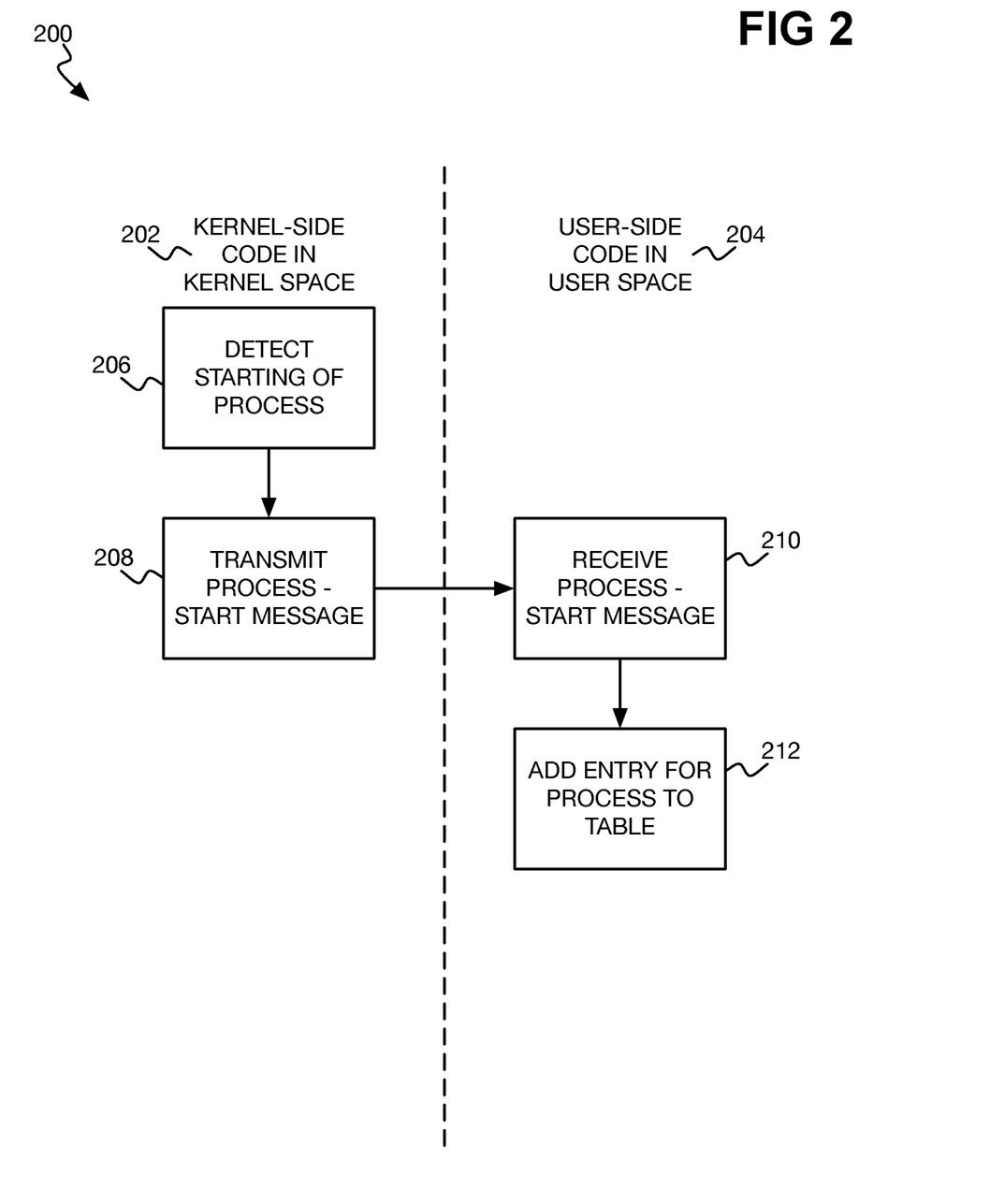
FIG. 2 is a flowchart of an example method for adding a table entry for a process when the process starts on an endpoint device.
Figure 3:
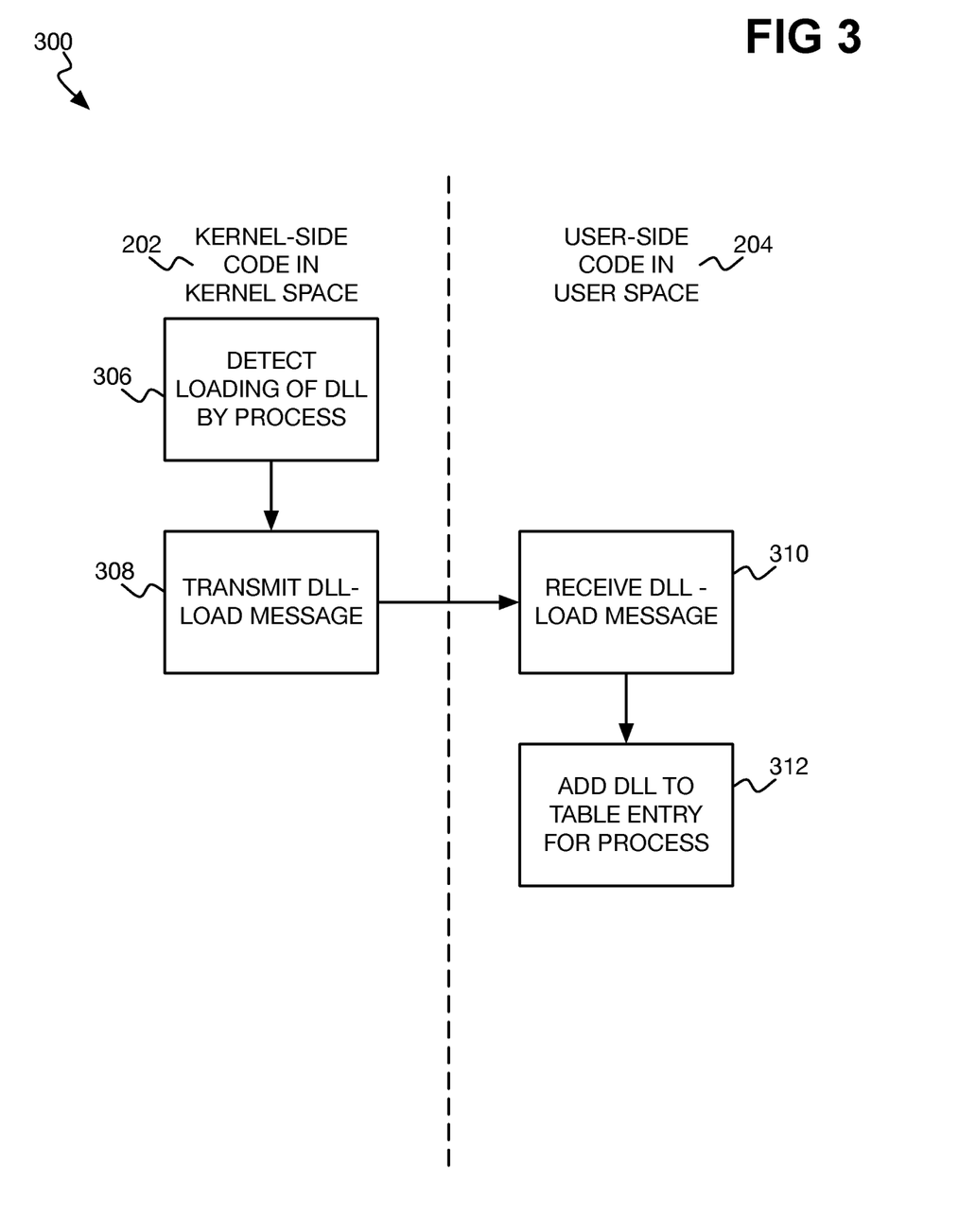
FIG. 3 is a flowchart of an example method for adding an identifier of a dynamically loaded (DLL) loaded by a process during execution on an endpoint device to a table entry for the process, when the device loads the DLL.
Figure 4:
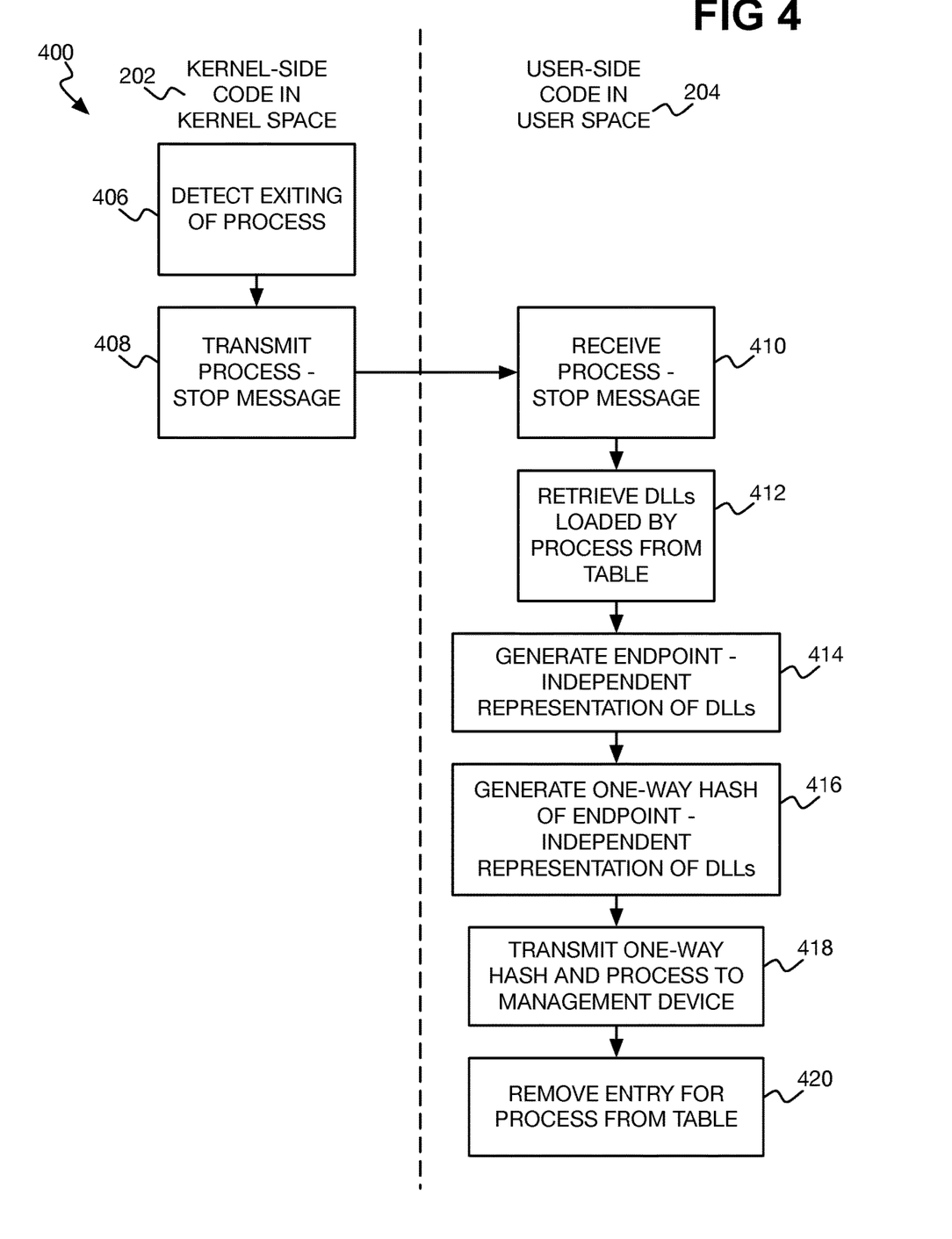
FIG. 4 is a flowchart of an example method for generating an endpoint-independent representation of DLLs loaded by a process during execution on an endpoint device, and a one-way hash of the endpoint-independent representation, once the process exits.

FIGS. 2, 3, and 4 show respective example methods 200, 300, and 400 by which an endpoint device 104 monitors execution of processes 108 and the loading of DLLs 110 by the processes 108, generates the endpoint-independent representations, and generates and transmits the one-way hashes in a specific implementation. The methods 200, 300, and 400 are each divided over two columns. The method parts in the left column can be performed in kernel space of the endpoint device 104, by kernel-side code 202 running on the device 104. The method parts in the right columns can be performed in user space of the endpoint device 104, by user-side code 204 running on the device 104.

The memory of the endpoint device 104 is divided into kernel space and user space. The kernel of the operating system of the endpoint device 104 runs in the kernel space. The kernel is the core component of the operating system. Other computer programs, such as application programs, run in the user space. More specifically, processes 108 and the DLLs 110 loaded by the processes 108 run in the user space. The kernel space is protected from the user space. That is, processes 108 running in the user space, including DLLs 110 loaded by the processes 108, cannot access kernel space, or at least cannot write into kernel space.

In one implementation, the method 200 of FIG. 2 is performed each time a process 108 starts executing on the endpoint device 104. The kernel-side code 202 detects starting of the process 108 (206). The kernel-side code 202 as opposed to the user-side code 204, detects starting of the process 108, because the kernel of the operating system running on the endpoint device 104 maintains a list of processes 108 that are currently executing on the device 104 (i.e., within the context of the operating system). The kernel-side code 202 responsively transmits a process-start message to the user-side code 204 (208). The process-start message includes the process 108. For example, the message can include an identifier of the process 108 that started executing, such as a process identifier (PID) that is unique to the process 108 in relation to other processes 108 on all the endpoint devices 104.

The user-side code 202 responsively receives the process-start message (210), and adds an entry for the process 108 to a table (212). The table is more generally a data structure. The table stores the currently executing processes 108 on the endpoint device 104, and for each such process 108, the DLLs 110 that the process 108 has loaded during the current execution of the process 108 on the device 104. When adding the entry for the process 108 to the table, the user-side code 210 may include the process 108 within the entry, such as an identifier of the process 108.

In one implementation, the method 300 of FIG. 3 is performed each time a process 108 executing on the endpoint device 104 loads a DLL 110. The kernel-side code 202 detects loading of the DLL 110 by the process 108. The kernel-side code 202, as opposed to the user-side code 204, detects loading of the DLL 110, because the kernel of the operating system running on the endpoint device 104 maintains a list of DLLs 110 that each process 108 currently executing on the device 104 has loaded. The kernel-side code 202 responsively transmits a DLL-load message to the user-side code 204 (308). The DLL-load message includes the process 108 that has loaded the DLL 110 as well as the DLL 110 itself. For example, the message can include an identifier of the process 108 and an identifier of the DLL 110, the latter which may be a file path of the DLL 110.

The user-side code 204 responsively receives the DLL-load message (310). The user-side code 204 then adds the DLL 110 identified in the DLL-load message to the table entry for the process 108 identified in the message (312). For example, within the entry including the identifier of the process 108, the user-side code 204 may add the identifier of the DLL 110, such as the file path thereof.

In one implementation, the method 400 of FIG. 4 is performed each time a process 108 executing on the endpoint device 104 exits. That is, the method 400 is performed each time a process 108 stops executing on the endpoint device 104. The kernel-side code 202 detects exiting of the process 108 (406). In other implementations, the method 400 may be performed when the DLLs 110 are first loaded by the process 108. In such instance, however, DLLs 110 that are subsequently loaded by the process 108 are not captured when the method 400 is performed. Therefore, the method 400 may be performed at another time as well (i.e., more than once), such as when the process 108 also exits, so that subsequently loaded DLLs 110 are also captured.

In the example of FIG. 4, the kernel-side code 202, as opposed to the user-side code 204, detects exiting of the process 108, because as noted above the kernel maintains a list of processes 108 that are currently executing on the endpoint device 104. The kernel-side code 202 responsively transmits a process-stop message to the user-side code 204 (408). As with the process-start message, the process-stop message includes the process 108, such as an identifier of the process 108 that has exited execution.

The user-side code 204 responsively receives the process-stop message (410), and retrieves from the table the DLLs 110 that were loaded by the process 108 identified in the process-stop message (412). For instance, the user-side code 204 retrieves the identifiers of the DLLs 110, such as their file paths, that were previously added to the entry for the process 108. The user-side code 204 then generates an endpoint-independent representation of these DLLs 110 (414). For example, the user-side code 204 may concatenate the identifiers of the DLLs 110, such as their file paths.

After generating the endpoint-independent representation of the DLLs 110 that the process 108 loaded during execution, the user-side code 204 generates a one-way hash of the endpoint-independent representation (416). Specifically, the user-side code 204 inputs the endpoint-independent representation of the DLLs 110 into a one-way hash function that outputs the one-way hash from the endpoint-independent representation. The one-way hash function is a mathematical function that takes a variable-length input string and converts it into a fixed-length binary sequence. The hash function is a one-way hash function in that it is practically infeasible to determine the endpoint-independent representation of the DLLs 110 from the generated one-way hash.

The hash function may be selected to minimize hash collisions, so that the same function can be used across the endpoint devices 104. That is, the hash function can be selected so that the probability that different endpoint-independent representations of the DLLs 110 will yield the same one-way hash is low. An example of a one-way hash function that can be employed is the Secure Hash Algorithm 2 (SHA-2) hash function. As has been noted, the hash may not be a one-way hash.

In the example of FIG. 4, the user-side code 204 transmits the one-way hash of the endpoint independent representation and the process 108 to the management device 102 (418). For instance, the user-side code 204 may transmit the one-way hash and the identifier of the process 108. The user-side code 204 concludes the method 400 by removing the entry for the process 108 from the table (420). This means that the next time the process 108 starts on the endpoint device 104, a new, empty entry for the process 108 will be added to the table per FIG. 2, to which DLLs 110 will be added as the process 108 loads the DLLs 110 per FIG. 3. In this respect, because the DLLs 110 loaded by the process 108 can vary across different executions on the endpoint device 102, the endpoint-independent representation can potentially differ each time the process 108 finishes executing.

Figure 5:
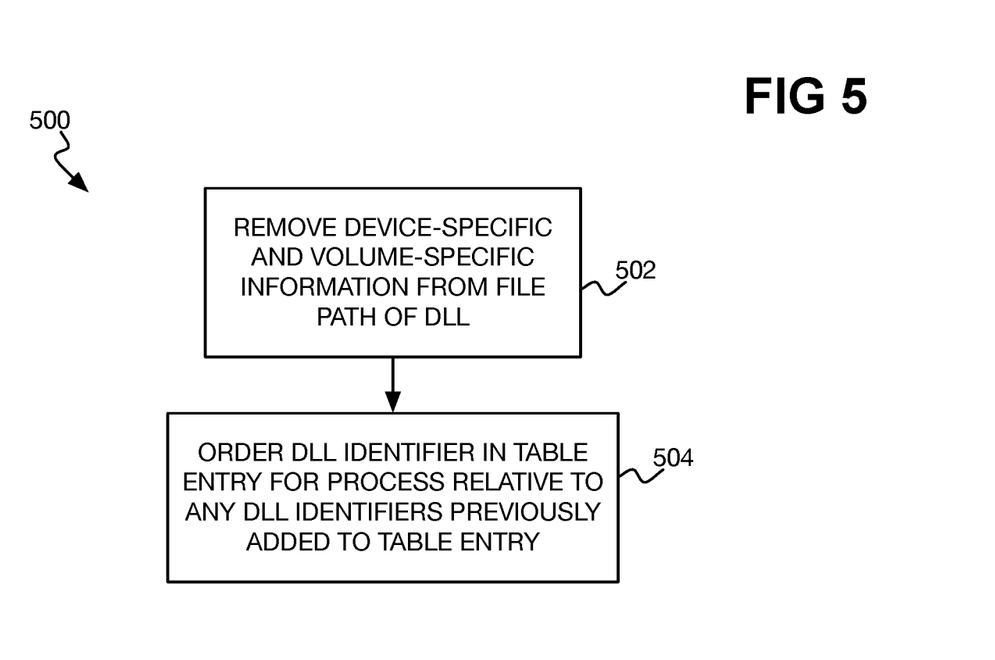
FIG. 5 is a flowchart of an example method that can be performed when adding an identifier for a DLL loaded by a process during execution on an endpoint device to a table entry for the process.

FIG. 5 shows an example method 500 that can be performed when the user-side code 204 running on the endpoint device 104 adds an identifier for a DLL 110 loaded by a process 108 to the table entry for the process 108. The method 500 can be performed, for instance, within part 312 of FIG. 3. In the example method 500, the identifier for the DLL 110 is or includes a file path of the DLL 110 as loaded by the process 108.

The file path of the DLL 110 can include the complete file path of the DLL 110, starting from the local or remote volume on which the DLL 110 is stored, through various directories and sub-directories if any, and ending with the name and extension of the filename of the DLL 110. An example file path for a locally stored DLL 110 may be "C:\Windows 32\System32\foo\bar\foobar.dll", where the drive letter "C:" references a primary volume on a local storage device of the endpoint device 104. An example file path for a remotely stored DLL 110 may be "X:\dll repository\foo\bar\foobar.dll", where the drive letter "X:" references a volume on a remote storage device to which the endpoint device 104 is communicatively connected over the network 106. The filename in both examples is "foobar.dll", including the extension ".dll". The other parts of the file paths, "\Windows 32\System32\foo\bar\" and "\dll repository\foo\bar\", are directories or sub-directories.

The user-side code 204 can remove any device-specific and volume-specific information from the file path of the DLL 110 (502). For example, drive letters like the drive letters "C:" and "X:" in the example file paths of the previous paragraph are device-specific and/or volume-specific information. The drive letter "C:" is volume-specific because it is specific to the volume on which the DLL 110 is stored in the first example, and similarly the drive letter "X:" is volume-specific because it is the specific to the volume on which the DLL 110 is stored in the second example. Both drive letters are device-specific because they are specific to the endpoint device 104 itself. For example, a different end point device 104 may use a drive letter other than "C:" to reference its primary volume, or a drive letter other than "X:" to reference the same volume in question on the remote storage device.

The user-side code 204 thus removes this device-specific and volume specific information from the file path of the DLL 110 in part 502. In the first example, the resulting file path is "\Windows 32\System32\foo\bar\foobar.dll". In the second example, the resulting file path is "\dll repository\foo\bar\foobar.dll". The device-specific and volume specific information is removed from the file path of the DLL 110 so that the identifier for the DLL 110 is the same across the endpoint devices 104. That is, the identifier for the same DLL 110 loaded by a process 108 executing on a different endpoint device 104 is identical, even if the endpoint device 104 in question uses a drive letter other than "C:" in the first example or "X:" in the second example.

The user-side code 204 can order the identifier for the DLL 110 in the table entry for the process 108 relative to any DLL identifiers previously added to the table entry (504). For example, the process 108 may have already loaded DLLs 110 identified by the file paths "C:\Windows 32\System 32\abc\def\dllone.dll" and "C:\Windows 32\System 32\xyz\dlltwo.dll". The user-side code 204 may therefore have already added the file paths "\Windows 32\System 32\abc\def\dllone.dll" and "\Windows 32\System 32\xyz\dlltwo.dll" to the table entry for the process 108, where the device-specific and volume-specific information "C:" was first removed from the file paths.

The process 108 may now have loaded a DLL 110 identified by the file path "C:\Windows 32\System32\foo\bar\foobar.dll". After removal of the device-specific and volume-specific information "C:", the file path is "\Windows 32\System32\foo\bar\foobar.dll". The user-side code 204, when adding the file path to the table entry for the process 108, can thus insert the file path between the file paths "\Windows 32\System 32\abc\def\dllone.dll" and "\Windows 32\System 32\xyz\dlltwo.dll" previously added to the table entry. The order in this case is an alphabetical ordering of the file paths, which \constitute the identifiers for the DLLs 110 loaded by the process 108 in its current execution.

Figure 6:
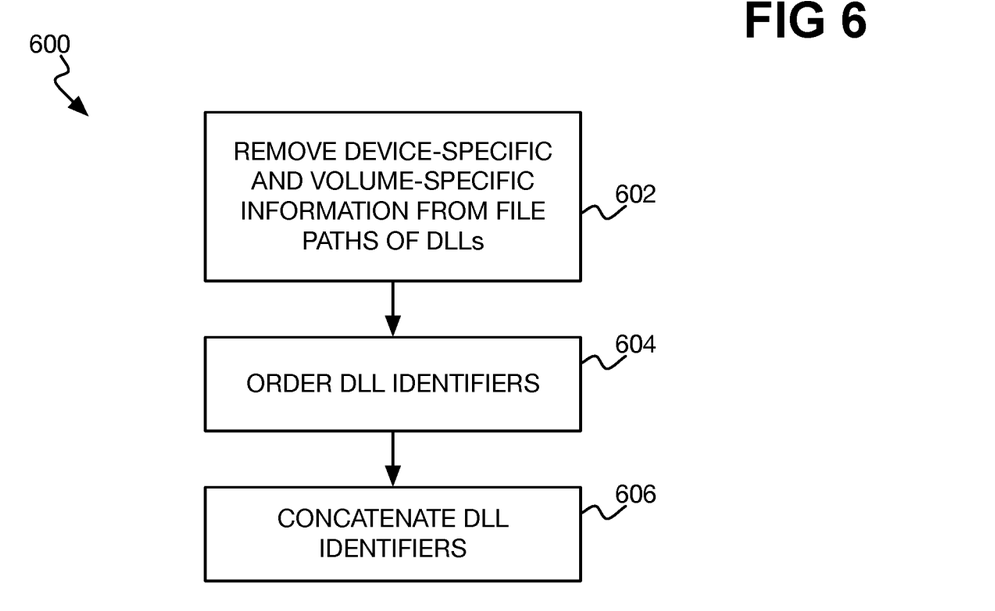
FIG. 6 is a flowchart of an example method that can be performed to generate an endpoint-independent representation of DLLs loaded by a process during execution on an endpoint device.

FIG. 6 shows an example method 600 that can be performed to generate an endpoint-independent representation of the DLLs 110 loaded by a process 108 during execution on an endpoint device 104. The method 600 can be performed, for instance, to implement part 414 of FIG. 4. That is, the user-side code 204 running on the endpoint device 104 can perform the method after the code 204 has retrieved the identifiers of the DLLs 110 from the table entry for the process 108 in part 412 of FIG. 4. In the example method 600, the identifiers for the DLLs are or include their file paths as loaded by the process 108. Furthermore, parts 602 and 604 in particular may be performed if the method 500 of FIG. 5 is not performed when adding the identifier for a DLL 110 to the table entry for the process 108 when the process 108 loads the DLL 110.

The user-side code 204 can remove any device-specific and volume-specific information from the file path of each DLL 110 (602), as in part 502 of FIG. 5. The user-side code 204 can also order the identifiers of the DLLs 110 (i.e., their file paths) (604), as in part 504 of FIG. 5. The user-code 204 then concatenates the identifiers of the DLLs 110 (606). The resulting string—e.g., the resulting concatenated ordered file paths of the DLLs 110 from which the device-specific and volume-specific information have been removed—constitutes the endpoint-independent representation of the DLLs 110. If the method 500 of FIG. 5 is performed when the identifier of a DLL is added to the table entry for the process 108, then just part 606 of the method 600 has to be performed, and not parts 602 and 604.

The endpoint-independent representation is independent of the endpoint device 104 on which the process 108 that loaded the DLLs 110 was executed at least because the device-specific and volume-specific information has been removed from the file paths of the DLLs 110. If the process 108 loaded the same DLLs 110 but was executed on a different endpoint device 104, the endpoint-independent representation would nevertheless be identical. The endpoint-independent representation is further independent of the order in which the process 108 loaded the DLLs 110 during execution because the file paths have been (alphabetically) ordered. If the process 108 loaded the same DLLs 110 during a different execution but in a different order, the endpoint-independent representation would nevertheless be identical.

Figure 7:
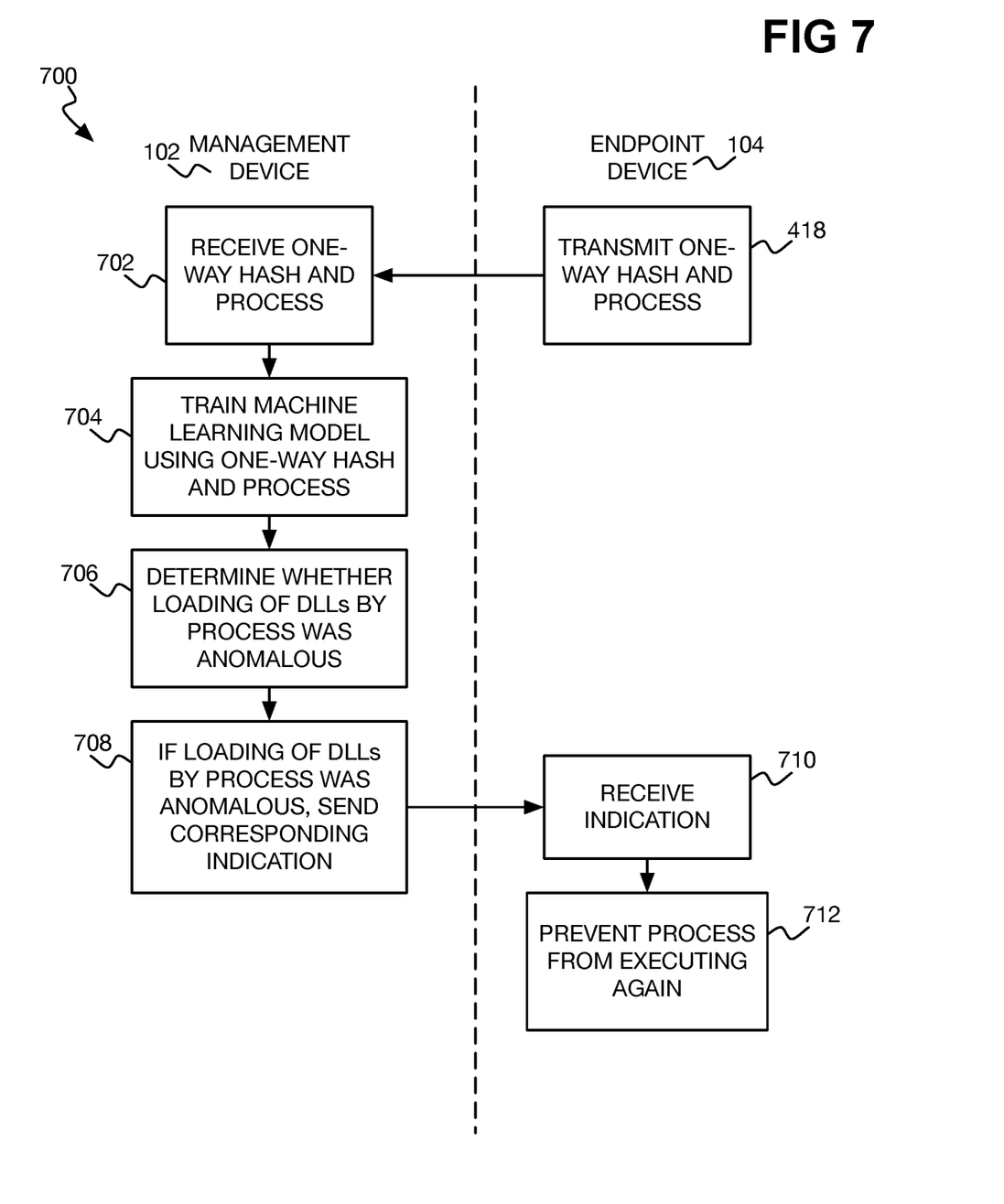
FIG. 7 is a flowchart of an example method for detecting in a machine learning manner whether loading of DLLs by a process on an endpoint device during execution was anomalous, by a management device.

FIG. 7 shows an example method 700 for detecting in a machine learning manner whether loading of DLLs 110 by a process 108 during execution on an endpoint device 104 was anomalous, by the management device 102. The method 700 is divided over two columns. The method parts in the left column can be performed by the management device 102, whereas the method parts in the right column can be performed by an endpoint device 104.

The method 700 is performed each time an endpoint device 104 generates a one-way hash of an endpoint-independent representation of the DLLs loaded by a process 110 during execution on the device 104. The method 700 is thus performed each time the method 400 of FIG. 4 is performed. The endpoint device 104 transmits a one-way hash and a process 108 to the management device 102 (418), as in FIG. 4. For example, the endpoint device 104 may transmits the one-way hash and an identifier of the process 108 to the management device 102.

The management device 102 receives the one-way hash and the process 108 (702), such as an identifier thereof, and may responsively train the machine learning model 114 using the received one-way hash and process 108 (704). For example, in an unsupervised learning technique, each time a one-way hash and a process 108 is received from an endpoint device 104, the machine learning model 114's knowledge is correspondingly refined or updated to improve its accuracy in detecting anomalies in DLL loading by processes 108 running on the endpoint devices 104. Therefore, the machine learning model 114 is continuously trained.

In another implementation, however, the machine learning model 114 may be trained in a supervised learning technique. In supervised learning, the machine learning model 114 may first be training against training data of DLL loading that is known to be anomalous and DLL loading that is known to not be anomalous. The accuracy of the model 114 can then be tested against other training data. The resulting trained machine learning model 114 can be employed in a production environment in which it is used to detect anomalous DLL loading. Periodically, the machine learning model 114 may be retrained or have its training updated, based on the number of false positives (identifying DLL loading as anomalous when it was not) and false negatives (not identifying DLL as anomalous when it was) that the model 114 output during actual use.

The management device 102 determines whether the loading of the DLLs 110 by the received process 110 during execution on the endpoint device 104, as encoded in the received one-way hash of the endpoint-independent representation of the DLLs 110, was anomalous (706). For example, the management device 102 can input the received one-way hash and the received process 108, such as the received identifier thereof, into the machine learning model 114. The management device 102 may receive as output from the machine model 114 a score or value indicative of the model 114's confidence level as to whether the loading of the DLLs 110 by the process 108 was anomalous. If the confidence level is greater than a threshold, the management device 102 may conclude that the DLL loading was anomalous.

The anomaly detection in part 706 leverages the information regarding DLL loading by processes 108 received from all the endpoint devices 104. The received one-way hashes are of representations of DLLs 110 that are independent of the endpoint devices 104. Therefore, the machine learning model 114 can detect anomalous DLL loading by a process 108 during execution on an endpoint device 104 using information regarding the same DLLs 110 loaded by the same process 108 during execution on other endpoint devices 104.

If the loading of the DLLs 110 by the process 108 was anomalous, the management device 102 sends a corresponding indication of this conclusion to the endpoint device 104 (708). The indication can include the process 108, such as an identifier thereof. The indication may not include the one-way hash, because the hash is not reversible to identify the endpoint-independent representation of the DLLs 110 loaded by the process 108 on which basis the one-way hash was generated.

Upon receiving the indication (710), the endpoint device 104 may prevent the process 108 from executing again (712). Parts 710 and 712 may be performed by security code running on the endpoint device 104, which may also execute in user space. The management device 102 can itself be said to prevent the process 108 from executing again insofar as the device 102 transmits an indication in part 708 that the endpoint device 104 receives in part 710 and responsively acts upon in part 712.

The endpoint device 104 prevents the process 108 from executing again, as opposed to preventing the process 108 from just loading the DLLs 110 that have been detected as anomalous. This is because, as noted above, the hash of the endpoint-independent representation of the DLLs 110 is a one-way hash and therefore the hash cannot be reversed to identify the DLLs 110 of the endpoint-independent representation. The endpoint device 104 does not prevent the process 108 from loading just the DLL(s) 110 that are specifically anomalous, since the anomaly detection is performed on the basis of the endpoint-independent representation of all the DLLs 110 loaded by the process 108, and not on the basis of the DLLs 110 individually.

The detection of anomalous DLL loading by a process 108 during execution on an endpoint device 104 and the resulting indication from the management device 102 to the device 104 occurs ex post facto—viz., after the process 108 has exited its execution on the endpoint device 104. Anomalous DLL loading detection does not occur while the process 108 is currently executing on the endpoint device 104. For instance, detection of anomalous DLL loading is not detected after the process 108 loads a DLL 110 while still executing on the endpoint device 104, nor before the process 108 loads the DLL 108.

The management device 102 may employ the information that anomalous DLL loading by a process 108 occurred in ways addition to or other than sending a corresponding indication to an endpoint device 104 on which basis the device 104 prevents the process 108 from executing again.

For example, the management device 102 may log each anomalous DLL loading by a process 108 during execution on any endpoint device 104. This information may then be presented for review to a network administrator or other user. The user may be responsible for assessing whether the anomalies detected warranted further investigation or action.

Figure 8:
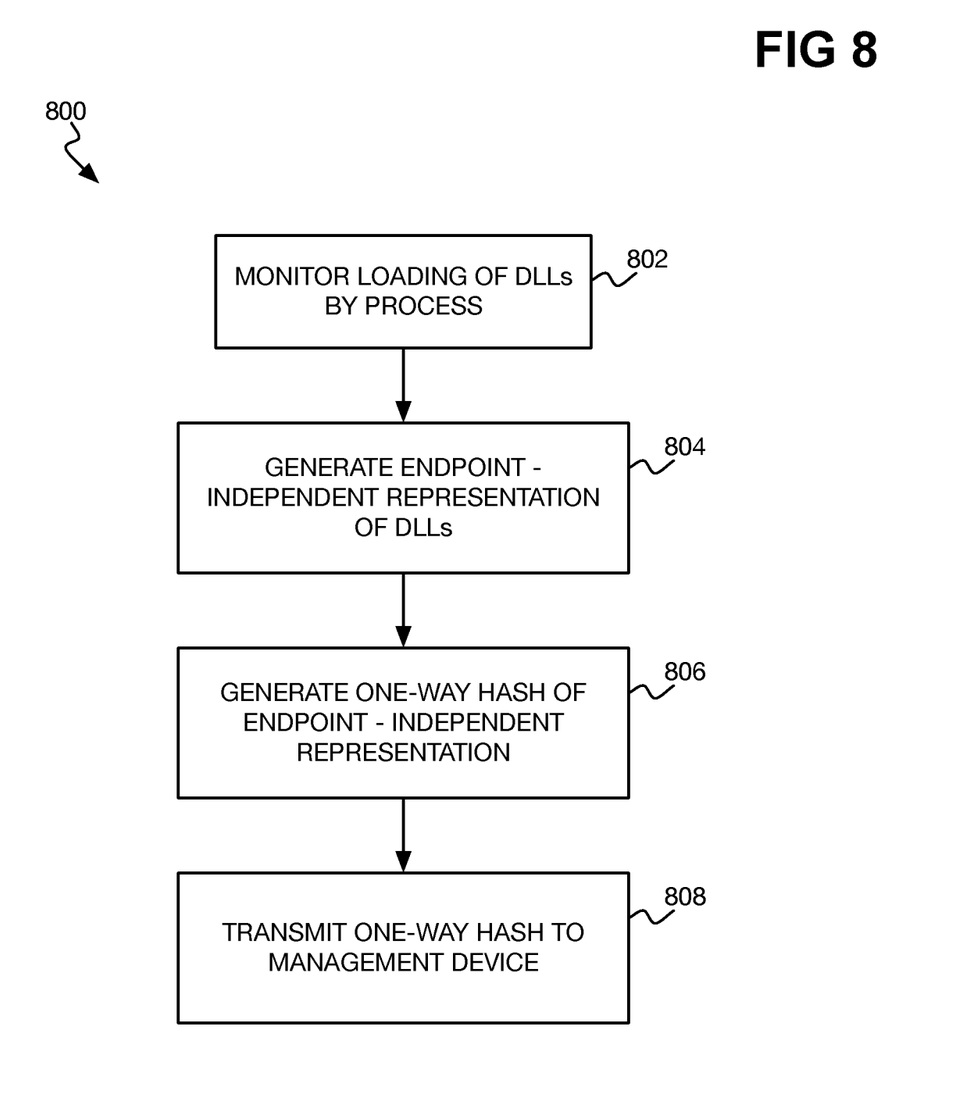
FIG. 8 is a flowchart of an example method performed by an endpoint device.

FIG. 8 shows an example method 800. The method 800 is performed by an endpoint device 104. The method 800 may be implemented as program code stored on a non-transitory computer-readable data storage medium, for execution by a processor of the endpoint device 104. The endpoint device 104 monitors loading of DLLs 110 by a process 108 during execution of the process 108 on the device 104 (802). The endpoint device 104 generates an endpoint-independent representation of the DLLs 110 upon exiting of the process 108 (804), and generates a one-way hash of the endpoint-independent representation (806). The endpoint device 104 transmits the process and the one-way hash to the management device 102 to detect in a machine learning manner whether loading of the DLLs 110 during the execution of the process 108 was anomalous (808).

Figure 9:
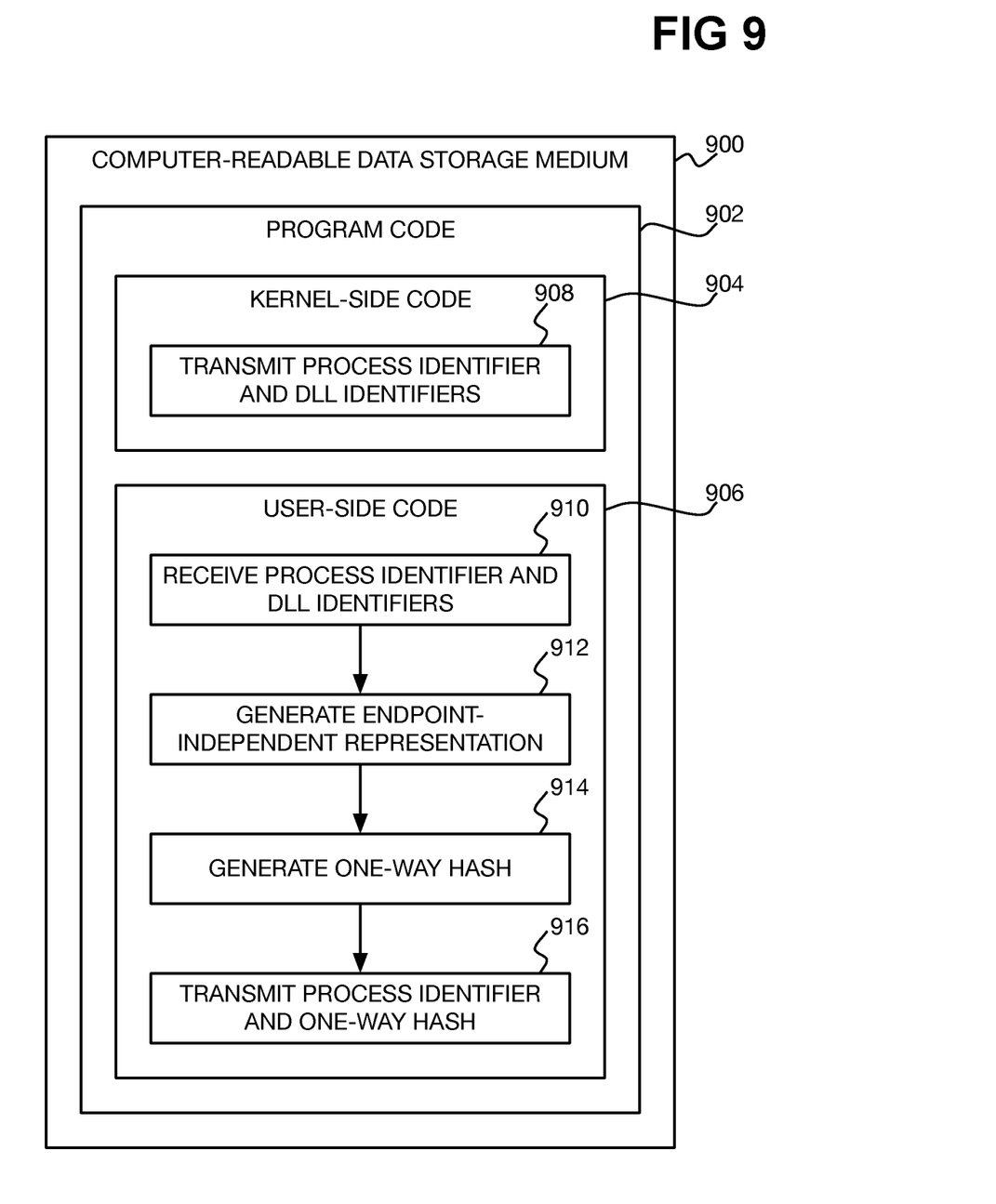
FIG. 9 is a diagram of an example non-transitory computer-readable data storage medium storing program code executable by an endpoint device.

FIG. 9 shows an example non-transitory computer-readable data storage medium 900. The computer-readable data storage medium 900 stores program code 902 executable by an endpoint device 104. The program code 902 includes kernel-side code 904 and user-side code 906. The kernel-side code 904 is to, during execution of a process 108 on the endpoint device 104, transmit an identifier of the process 108 and identifiers of DLLs 110 loaded by the process 110.

The user-side code 906 is to receive the identifier of the process 108 and the identifiers of the DLLs 110 from the kernel-side code 904 (910). The user-side code 906 is to generate an endpoint-independent representation of the identifiers of the DLLs 110 upon exiting of the process 108 (912), and a one-way hash of the endpoint-independent representation (914). The user-side code 906 is to transmit the identifier of the process 108 and the one-way hash to the management device 102 to detect in a machine learning manner whether loading of the DLLs 110 during execution of the process 108 was anomalous (916).

Figure 10:
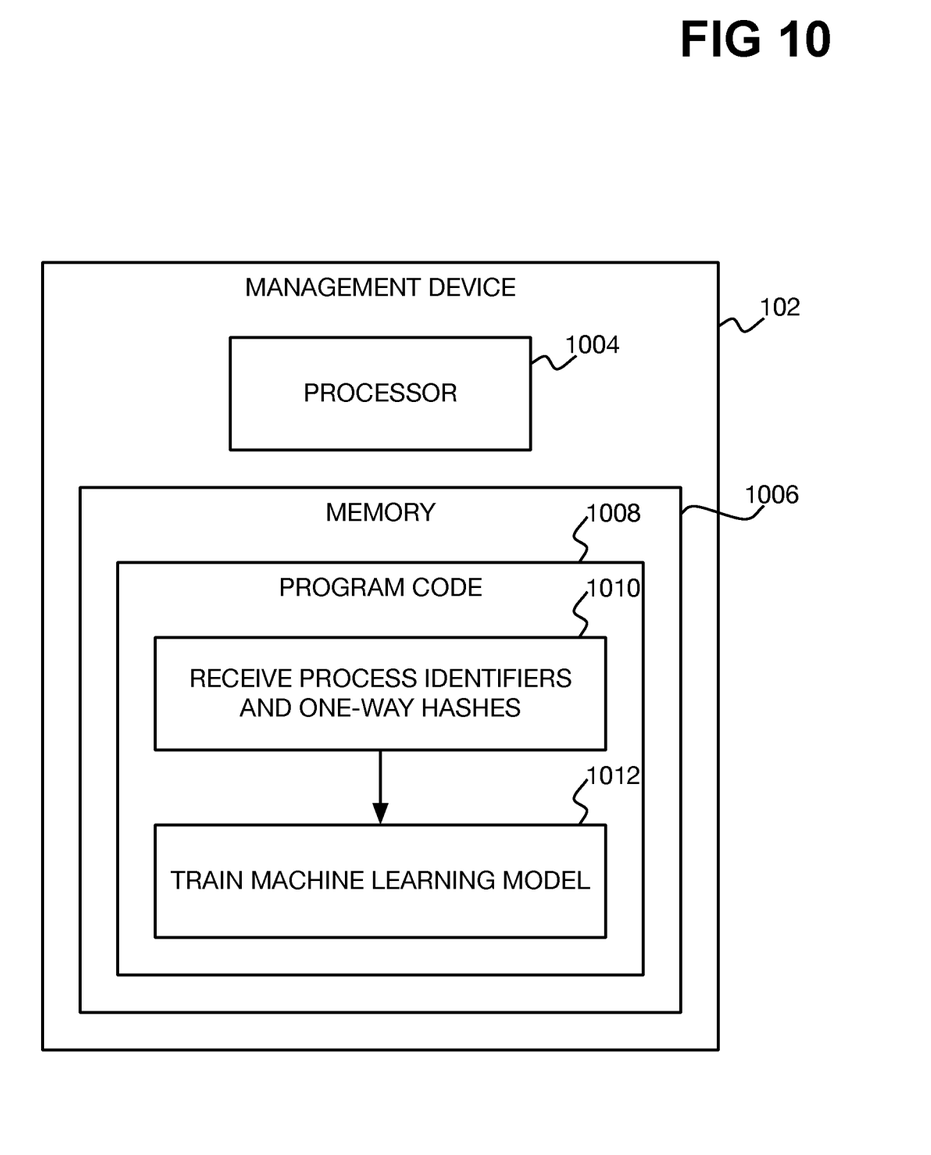
FIG. 10 is a block diagram of an example management device.

FIG. 10 shows an example implementation of the management device 102. The management device 102 includes a processor 1004 and a memory 1006 storing program code 1008. The program code 1008 is executable by the processor 1004 to receive identifiers of processes 108 and one-way hashes from endpoint devices 104 (1010). Each one-way hash is for an endpoint-independent representation of DLLs 110 loaded during execution of a corresponding process 108 on an endpoint device 104. The program code 1008 is executable by the processor 1004 to train the machine learning model 114 from the identifiers of the processes 108 and the one-way hashes that have been received. The machine learning model 114 is used to detect anomalous DLL loading during process execution on the endpoint devices 104.

The techniques described herein provide for anomalous DLL loading by processes during execution on endpoint devices in a performance-efficient manner that a management device can tractably perform, that does not oversaturate a network interconnecting the management and endpoint devices, and that does not slow process execution on the endpoint devices. The techniques described herein can employ a hash of an endpoint-independent representation of the DLLs loaded by a process during execution on an endpoint device. The endpoint-independent representation may not be generated until the process finishes executing on an endpoint device, and may be generated each time a process executes on an endpoint device. The endpoint device transmits just the hash and the process (i.e., an identifier thereof) to the management device, instead of each DLL (i.e., an identifier thereof) that the process loads, as the process loads the DLLs.

I claim:

1. A method comprising:
   monitoring, by an endpoint device, loading of dynamically loaded libraries (DLLs) by a process
   generating, by the endpoint device, a representation of the DLLs;
   transmitting, by the endpoint device, the process and the representation to a management device to detect in a machine learning manner whether loading of the DLLs during execution of the process was anomalous;
   receiving, by the endpoint device, an indication from the management device that the loading of the DLLs was anomalous; and
   responsively preventing, by the endpoint device, the process from executing again on the endpoint device.

2. The method of claim 1, wherein the representation of the DLLs is an endpoint-independent representation of the DLLs, the method further comprising:
   generating, by the endpoint device, a hash of the endpoint-independent representation,
   wherein transmitting the process and the representation comprises transmitting the process and the hash.

3. The method of claim 2, wherein transmitting the process and the hash to the management device comprises:
   transmitting an identifier of the process and the hash to the management device.

4. The method of claim 1, wherein loading of the DLLs is monitored during execution of the process,
   and wherein the representation of the DLLs is generated upon exiting of the process.

5. The method of claim 1, wherein generating the representation comprises:
   concatenating identifiers of the DLLs,
   wherein the concatenated identifiers of the DLLs constitute the representation.

6. The method of claim 5, further comprising:
   prior to generating the representation, ordering the identifiers of the DLLs.

7. The method of claim 5, wherein the identifiers of the DLLs comprise file paths of the DLLs, and wherein the method further comprises:
   prior to generating the representation, removing device-specific and volume-specific information from the file paths of the DLLs.

8. A non-transitory computer-readable data storage medium storing program code executable by an endpoint device, the program code comprising:
   kernel-side code to:
      during execution of a process on the endpoint device, monitor loading of dynamically loaded libraries (DLLs) by the process; and
      transmit an identifier of the process and identifiers of the DLLs;
   user-side code to:
      receive the identifier of the process and the identifiers of the DLLs from the kernel-side code;
      generate an endpoint-independent representation of the identifiers of the DLLs upon exiting of the process;
      generate a hash of the endpoint-independent representation; and
      transmit the identifier of the process and the hash to a management device to detect in a machine learning manner whether loading of the DLLs during execution of the process was anomalous.

9. The non-transitory computer-readable data storage medium of claim 8, wherein security code of the program code is to prevent the process from executing again on the computing device responsive to receiving an indication from the management device that the loading of the DLLs during the execution of the process was anomalous.

10. The non-transitory computer-readable data storage medium of claim 8, wherein the kernel-side code is further to transmit a process-start message including the identifier of the process upon starting of the process, and wherein the user-side code is further to receive the process-start message from the kernel-side code and responsively add an entry for the identifier of the process to a data structure.

11. The non-transitory computer-readable data storage medium of claim 10, wherein the kernel-side code is to transmit the identifier of the process and the identifiers of the DLLs by:

each of a plurality of times the process loads one of the DLLs, transmit to the user-side code a DLL-load message including the identifier of the process and the identifier of the one of the DLLs, the user-side code receiving the DLL-load message, and wherein the user-side code is further to, responsive to receiving the DLL-load message, add the identifier of the one of the DLLs to the entry for the identifier of the process.

12. The non-transitory computer-readable data storage medium of claim 11, wherein the user-side code is to, when adding the identifier of the one of the DLLs to the entry for the identifier of the process, order the identifier of the one of the DLLs relative to identifiers for other DLLs previously added to the entry for the identifier of the process.

13. The non-transitory computer-readable data storage medium of claim 11, wherein the identifier of the one of the DLLs comprises a file path of the one of the DLLs, and wherein the user-side code is to, when adding the identifier of the one of the DLLs to the entry for the identifier of the process, remove device-specific and volume-specific information from the file path.

14. The non-transitory computer-readable data storage medium of claim 11, wherein the kernel-side code is further to transmit a process-stop message including the identifier of the process upon exiting of the process, and wherein the user-side code is further to receive the process-stop message from the kernel-side code and responsively generate the endpoint-independent representation.

15. The non-transitory computer-readable data storage medium of claim 14, wherein the user-side code is further to, when generating the endpoint-independent representation, order the identifiers of the DLLs added to the entry for the identifier of the process.

16. The non-transitory computer-readable data storage medium of claim 14, wherein the identifiers of the DLLs comprises file paths of the DLLs, and wherein the user-side code is further to, when generating the endpoint-independent representation, remove device-specific and volume-specific information from the file paths of the DLLs.

17. The non-transitory computer-readable data storage medium of claim 14, wherein the user-side code is to generate the endpoint-independent representation by:

concatenating the identifiers of the DLLs added to the entry for the identifier of the process, wherein the concatenated identifiers of the DLLs constitute the endpoint-independent representation.

18. A management device comprising:

a processor; and a memory storing program code executable by the processor to:

receive identifiers of processes and representations from endpoint devices, each representation of dynamically loaded libraries (DLLs) loaded during execution of a corresponding process on a corresponding endpoint device;

train a machine learning model from the identifiers of the processes and the representations that have been received, the machine learning model used to detect anomalous DLL loading during process execution on the endpoint devices;

each of a plurality of times that the identifier of one of the processes and one of the representations is received from one of the endpoint devices, detect whether loading of the DLLs of the one of the representations during the execution of the one of the processes was anomalous, using the machine learning model; and in response to detecting that the loading of the DLLs of the one of the representations during the execution of the one of the processes was anomalous, preventing the one of the processes from executing again on the one of the endpoint devices.

19. The management device of claim 18, wherein each representation comprises an endpoint device-independent representation.

20. The management device of claim 18, wherein each representation comprises a hash of an endpoint device-independent representation.

* * * * *